March 24, 1931. A. JORDANOGLOU 1,797,347
AIRPLANE
Filed Feb. 3, 1930 6 Sheets-Sheet 1
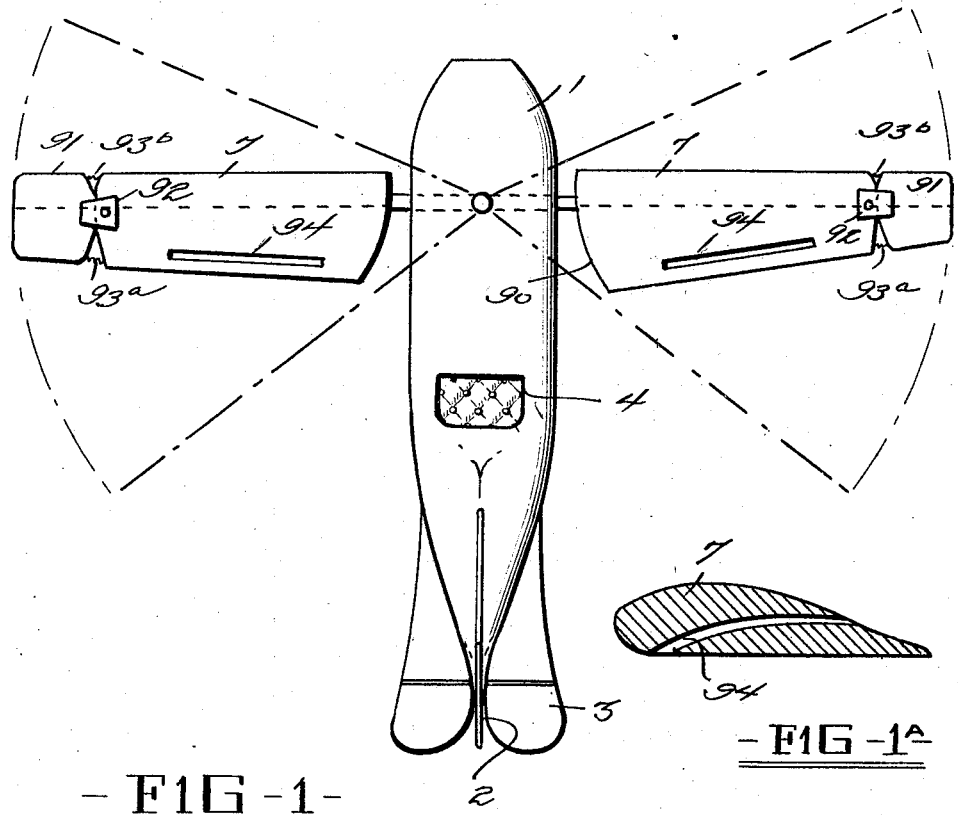
FIG-1-
FIG-1ᴬ-
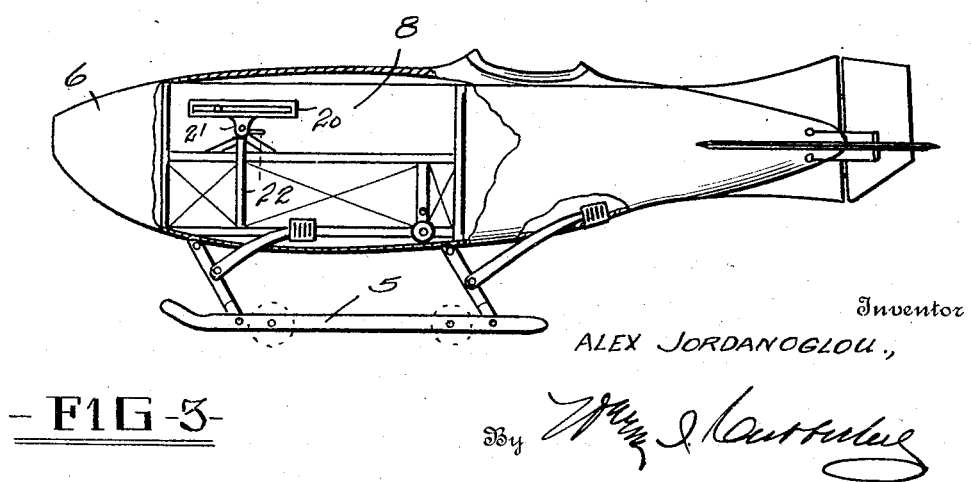
FIG-3-
Inventor
ALEX JORDANOGLOU, March 24, 1931. A. JORDANOGLOU 1,797,347
AIRPLANE
Filed Feb. 3, 1930 6 Sheets-Sheet 2
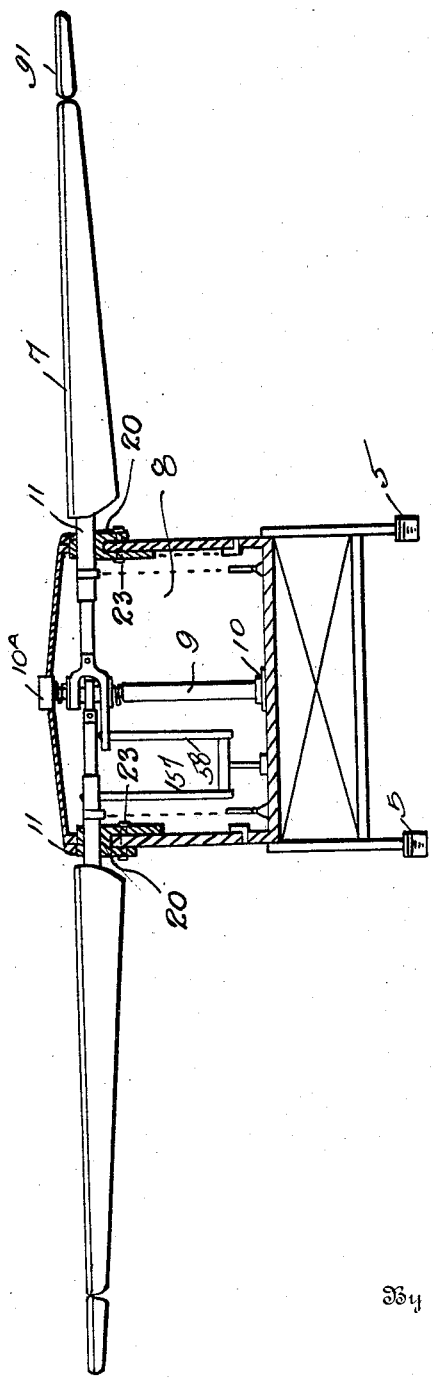
Inventor
ALEX JORDANOGLOU.
By
Attorney

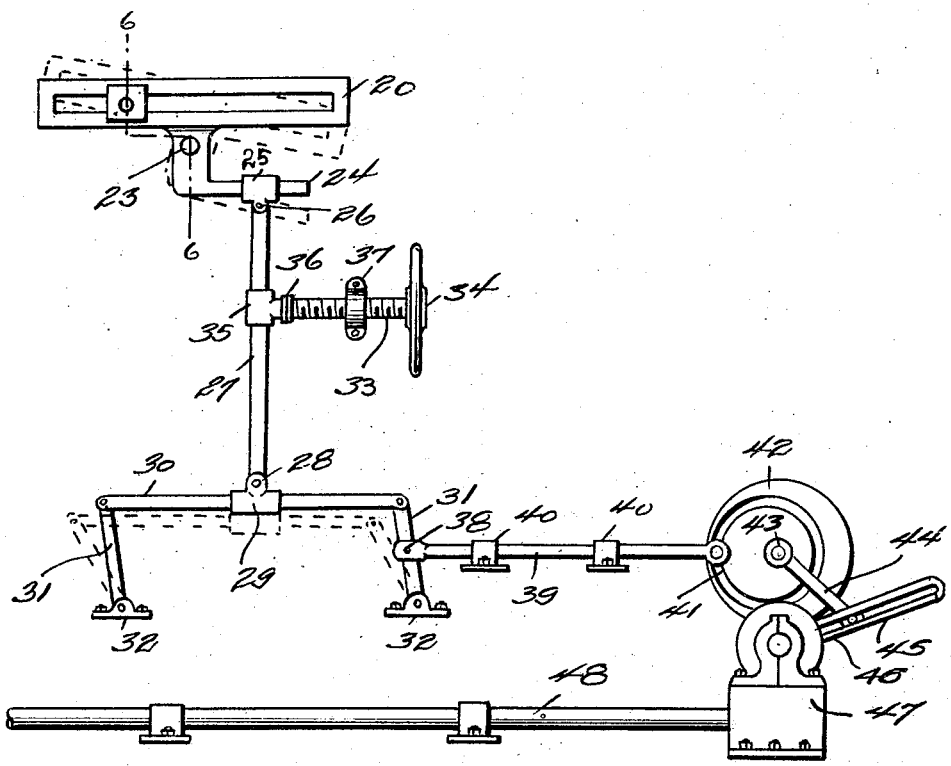
FIG-4-
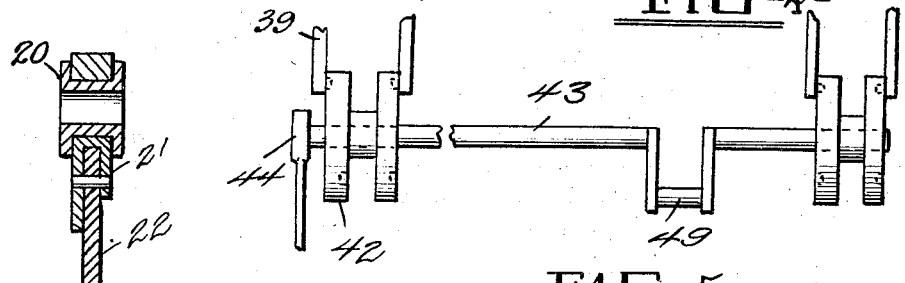
FIG-5-
FIG-6-

March 24, 1931.  A. JORDANOGLOU  1,797,347
AIRPLANE
Filed Feb. 3, 1930  6 Sheets-Sheet 4
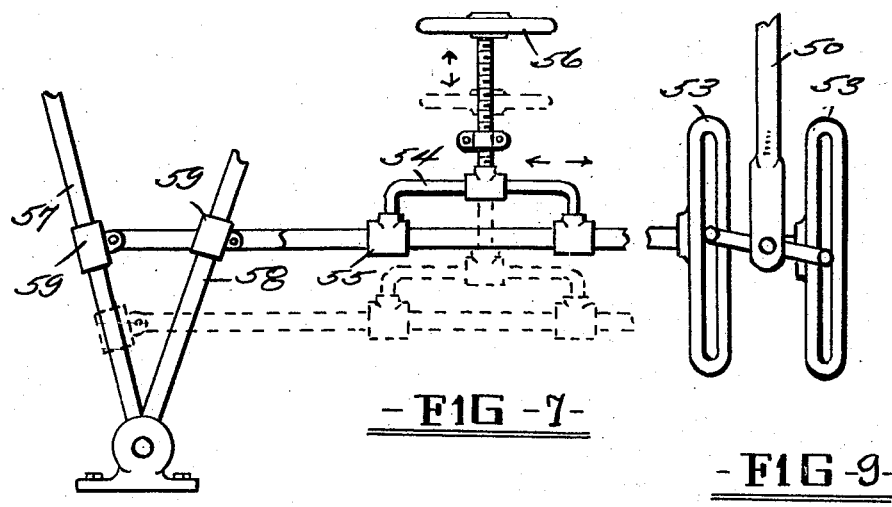
FIG-7-
FIG-9-
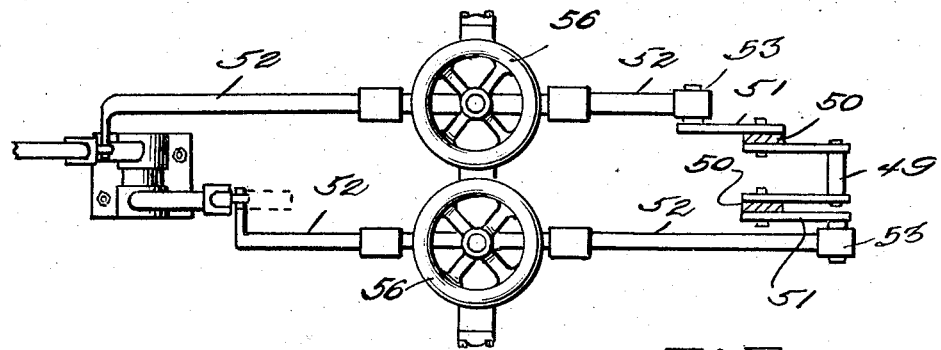
FIG-8-
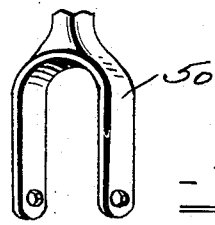
FIG-10-
Inventor
ALEX JORDANOGLOU,
By
Attorney

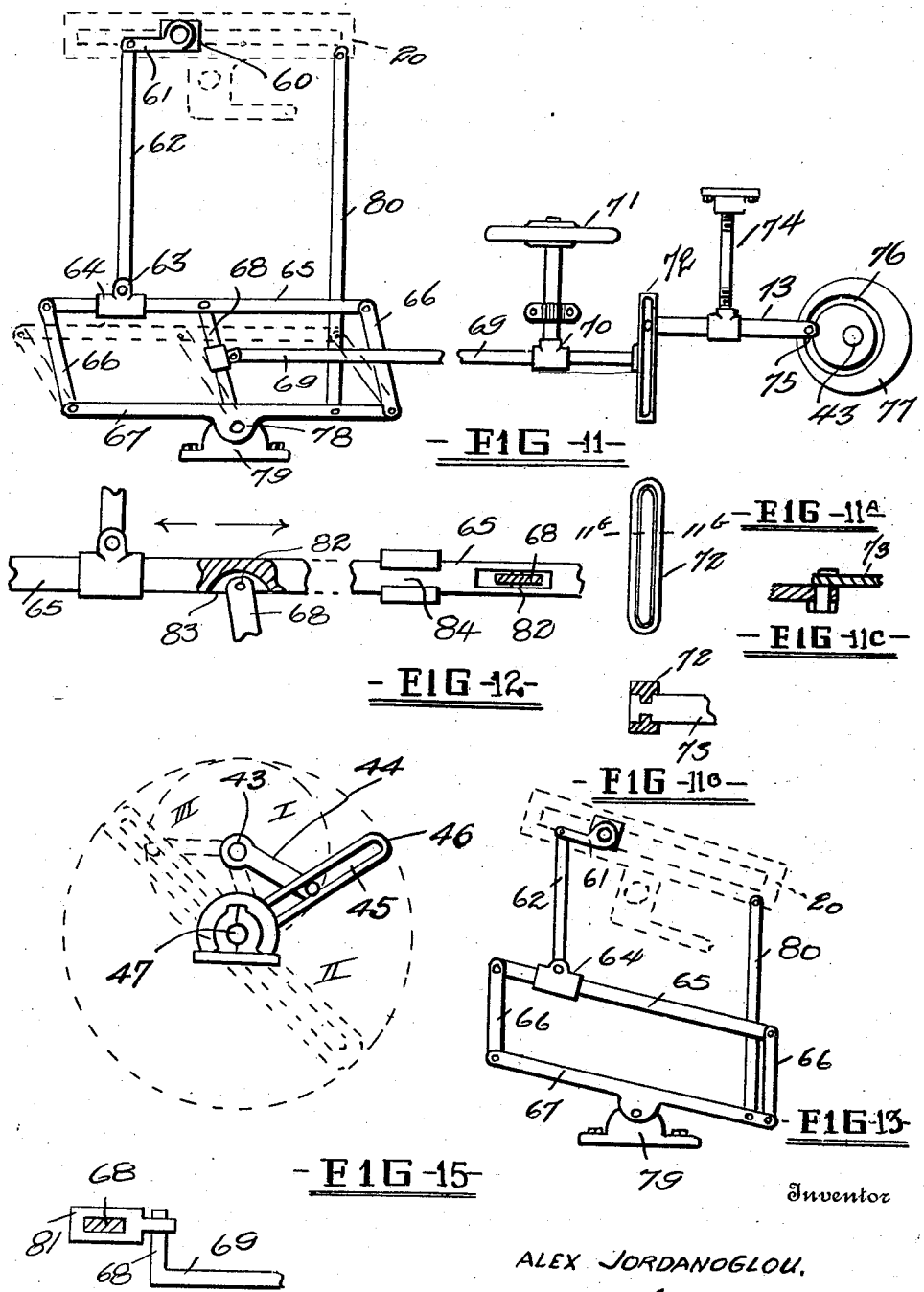

March 24, 1931.  A. JORDANOGLOU  1,797,347
AIRPLANE
Filed Feb. 3, 1930  6 Sheets-Sheet 6
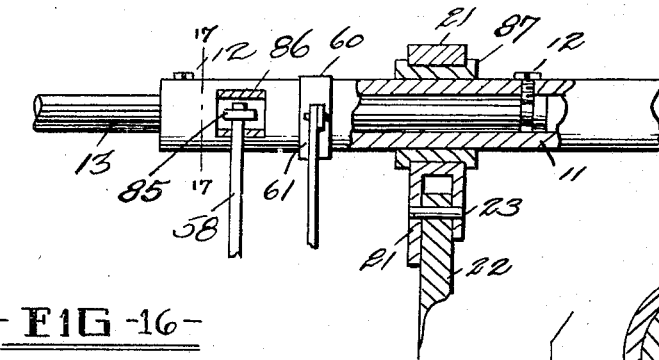
- FIG -16-
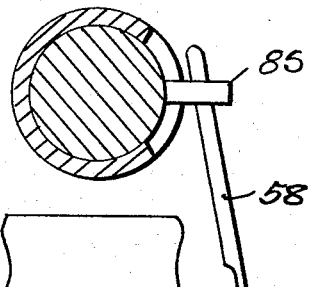
- FIG -17-
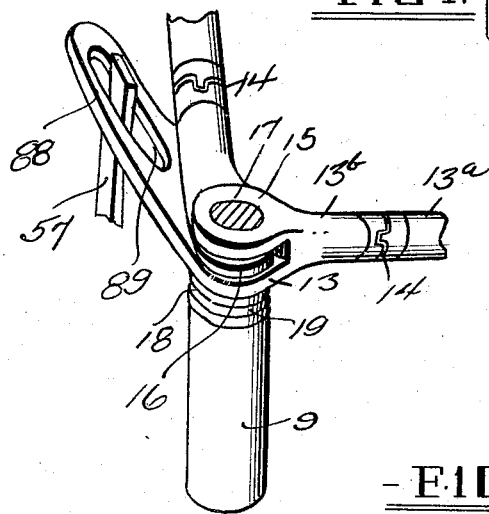
- FIG -18-
Inventor
ALEX JORDANOGLOU.
Attorney Patented Mar. 24, 1931

1,797,347

UNITED STATES PATENT OFFICE

ALEX JORDANOGLOU, OF WASHINGTON, DISTRICT OF COLUMBIA

AIRPLANE

Application filed February 3, 1930. Serial No. 425,558.

My present invention in its broad aspect has to do with improvements in airplanes of the type generally known as ornithopters, namely, that type of airplanes which are sustained in flight by movement of the wings, closely resembling those of a bird. More particularly it is my purpose to provide a monoplane type of aircraft wherein the wings are given a forward and backward motion and at the same time are caused to move rapidly up and down (flap) and at the same time modifying the angle of attack, providing a constant lift, and otherwise very closely approximating the movement of the wing of a bird, even to the extent of increasing the velocity of movement of all of the wing parts much more in the reverse direction than in the forward direction.

In order that the airplane may take off without first requiring the usual taxying, I have provided mechanism whereby the up and down motion and the forward and backward motion, together with all other motions of the wings and the angle of attack are increased greatly in the reverse so that the necessary lift is induced by the motion of the wings only from a normal position of rest. I have further provided means whereby all of the motions of the wings of my airplane may be adjusted at the will of the operator and whereby the inherent stability of the machine may be increased, side slip prevented, and a greater margin of safety induced. By controlling the angle of attack of the wings the proper lift may be provided for any particular motion of the wings, either forward or backward, and the lift induced by the forward movement of the plane may be utilized to its greatest extent. Furthermore, the normal head resistance of the plane may be reduced when its maximum speed is obtained, while at the same time the greatest lift and maximum resistance may be obtained when the plane is in its normal position of rest prior to rising. The back and forth motion of my wings enable the plane to rise directly from a position of rest without taxying, and to land at a minimum or no air speed, and by greatly increasing the velocity of the movement of the wings in a reverse direction, sustained lift is obtained and the continuity of lift preserved by increasing the interval of the flapping motion at the dead center point when the movement of the wings is changing either from a forward to a backward, or a backward to a forward motion.

I have reduced the number of working parts of my invention to a minimum; have provided means whereby all of the parts are rendered adjustable; have conserved the space necessary to house the machinery, and have reduced the weight to a minimum, thereby increasing the capacity of the plane to carry a load. Other and equally important objects of my invention will become apparent as the description proceeds, but in connection therewith it is emphasized that interpretation of the invention should only be conclusive when made in the light of the claims appended hereunto. In the drawings, wherein my invention is illustrated, Figure 1 is a top plan view of an airplane, showing in a general way the mode of operation of the wings.

Figure 1a is a transverse section through one of the wings showing the arrangement of the slot therein.

Figure 2 is a sectional front elevation of an airplane taken through the fuselage, and looking towards the entering edge of the wings.

Figure 3 is a sectional side view, and shows the relative position and arrangement of the parts.

Figure 4 is a schematic view of the mechanism whereby the up and down or flapping motion of the wings is induced.

Figure 5 is a view of the drive shaft and cam elements thereon whereby the various parts of my invention are operative.

Figure 6 is a view taken on the line 6—6 of Figure 4.

Figure 7 is a schematic view of the mechanism whereby the back and forth motion of the wings is produced.

Figure 8 is a top plan view which is substantially schematic of the mechanism shown in Figure 7.

Figure 9 is a detailed view of the crank gear and slot drive mechanism of the shafts shown in Figure 7.

Figure 10 is a view of the hanger for the crank gear and slot mechanism.

Figure 11 is a substantial schematic view of the mechanism utilized to vary the angle of attack of the wings.

Figure 11a is a view of the guide slot element for driving the mechanism in Figure 11.

Figure 11b is a section taken on the line 11b and 11b of view 11a.

Figure 11c is a sectional detail of the pin and cam groove connection shown in Figure 11.

Figure 12 is a detailed view of the manner in which the master bar is connected to the upper bar of the parallelogram drive element shown in Figure 11.

Figure 13 is a view of the mechanism shown in Figure 11, and illustrates the manner in which the angle of attack is changed as the wings move up and down, or flap.

Figure 14 is a view of the drive rod and master bar connections.

Figure 15 is a schematic view of any one of the cam elements whereby the velocity of motion in a rearward direction is increased four or more times over the velocity of movement in a forward direction.

Figure 16 is a detailed view of the wing arm keeper, guide, wing arm butt and operating elements to cause both forward and backward movement, and change the angle of attack of the wings.

Figure 17 is a perspective view of the connection between the wing arm butt and the oscillating member which causes the wings to assume the backward and forward motion by means of the power elements shown in Figure 2.

Figure 18 is a perspective view of the manner of connecting the wings with the wing mast shown in Figure 2 in its relationship to the other parts of my airplane.

In the drawings wherein like characters of reference are used to designate like or similar parts throughout the several views thereof.

The numeral 1 designates the fuselage of an airplane of a monoplane type and which has the usual directional and vertical control elements 2 and 3; the driver's seat, 4; landing gear 5; the nose, 6 (wherein the power plant, not shown, is preferably located) and wings, 7; in compartment, 8, forward of driver's seat, 4, is located a mast, 9, which is fixed in a bearing, 10, on the floor of the fuselage and retained by fitting, 10a, in the roof of the fuselage. The mast is substantially vertically positioned and fixed. The wings, 7, are of any suitable construction and each has a sleeve element, 11, within which is retained by means of one or more studs, 12, the wing arm butt, 13.

Each wing arm butt, 13, is formed in sections, 13a and 13b, connected by a universal joint, 14, of any suitable type. One wing arm butt is bifurcated to form spaced members, 15, and the other wing arm butt has a cooperating member, 16, designed to be placed between the two members, 15, and all of said members are provided with an opening, 17, to be mounted pivotally upon the wing mast, 9. Above and below the wing arm butts, 13, are washers, 18, and beneath the washers are springs, 19, so that there is a certain amount of "give" with respect to the pivotal movement of the wing arm butts on the wing mast.

*Flapping or up and down motion of wings*

Located in each side of the fuselage in the compartment, 8, are slotted members, 20. These slotted members each have a substantial U-shaped depending part, 21, within which fits a beam, 22, of the fuselage, and through which extends a pivot pin, 23. See Figure 16. The structure of the side walls of the fuselage is broken away to permit the slotted members, 20, to oscillate up and down on the pin, 23, and formed on the lower part of the inner element of each of the U-shaped members, 21, is an arm, 24, which is substantially parallel with the upper and lower bars of the slotted member, 20, and which extends in a rearward direction. Mounted for sliding movement on the arm, 24, is a coupling, 25, to which is pivotally connected, as at 26, a vertical bar, 27, the lower end of which is pivotally connected as at 28 with a coupling, 29, slidably mounted on the member, 30, connecting the upper ends of a pair of relatively parallel pivoted members, 31, the lower ends of which are pivotally retained in bearings, 32. Between the ends of the vertical bar, 27, is an adjusting member, having a screw threaded shaft, 33, an operating wheel, 34, on the end of the shaft, and a sleeve, 35, slidably engaging the bar 27, and having a connection, 36, permitting a slight rocking motion of the bar 27. The adjusting bar is mounted in a suitable bearing, 37. Pivotally connected to one of the parallel members, 31, as at 38 is a reciprocating drive shaft, 39, mounted in steady bearings, 40, and having its remaining end operably associated, as at 41, with the groove of a cam, 42, keyed to the drive shaft, 43. The groove in the cam is so formed that the rod is caused to reciprocate with such amplitude that the parallel bars, 31, and bar, 30, are moved forwardly and backwardly, one position being shown in dotted line in Figure 4, thereby to rock the slotted guide, 20, on its pivot point, 23, the amplitude of such rocking motion being determined by the position of the vertical shaft, 27, same having slidable connection through the members, 25 and 29, with the arm, 24, and rod, 30.

The shaft, 43, is mounted in suitable bearings, preferably supported on the floor of the fuselage, and has keyed thereto a crank arm, 44, which works in the slot, 45, in the operating element, 46, which is operatively connected with the transmission mechanism, 47, through which the power shaft, 48, operates. By reference to Figure 15, it will be seen that the movement transmitted by the crank-slot-lever arrangement heretofore described, greatly increases in one cycle of its operation, and decreases in the other, caused by the movement of the crank toward the center of rotation of the member, 46, thereby decreasing or increasing the crank arm through which power is transmitted. One position is illustrated in full lines in Figure 15, and two other positions taken at random are shown in dotted lines, the three positions being designated 1, 2, and 3. Accordingly, by the arrangement illustrated, the backward motion of the drive shaft, 39, is four times or more greater than its forward motion and the velocity of rotation of the shaft, 43, is always four times or more greater in one cycle than in the other. Since there is one slotted guide device, 20, on each side of the fuselage, all of the operating mechanism heretofore described, is duplicated on each side of the fuselage, and the other end of the drive shaft, 43, has a similar cam, 42, thereon which operates through similar drive shaft parallel bars, vertical bar 27, and the like.

Since the arm of each wing, 7, extends through a guide slot, the up and down of the wing is determined by the rocking motion of the guide slots in the manner which will be hereinafter described.

Back and forward motion

Hung from the ceiling or roof of the fuselage is a crank element, 49′, which is connected by an operating rod (not shown) with a similar crank element, 49, on the shaft, 43, so that said cranks are operated in unison. The upper crank element, 49′, is carried in a hanger, 50—see Figure 10—and has connected therewith a pair of links, 51, which, in turn, are connected with reciprocating drive elements, 52, through the instrumentality of the slotted bearing, 53, on the ends of the reciprocating drive shafts, 52. Said drive shafts, 52, are carried in hangars, 54, there being slidable bearings, 55, in said hangars, and said hangars being each connected with an adjusting rod and wheel, 56, so that the position of the drive shafts may be regulated up or down; such up and down motion being compensated for by the slots in the elements, 53. Mounted on the floor of the fuselage is a bearing member, 56, in which are mounted a pair of vertical, oscillating arms, 57 and 58, with which the ends of the respective shafts, 52, are slidably connected by fittings, 59, so that the reciprocating motion induced through the crank, 49′, is transmitted to the members 57 and 58, and these in turn, are connected in a manner which will be hereinafter described, with the respective wings, 7, so that the wings are caused to move back and forth.

Cooperation of parts causing up and down motion and forward and rearward motion Since the wings are caused to move forward and backward at the same time that the guide members, 20, are caused to oscillate on pivots, 23, the wings are caused to move up and down simultaneously with the movement forward and backward, and the greatest up and down motion is approached as the wings reach the limit of their forward and backward motion, thus compensating for any lag or decrease in the lift at the point in the forward and backward motion of each when the lift would ordinarily be at a minimum (namely, the point when the movement is reversed). Furthermore, by means of the crank arm and slot motion heretofore described with reference to Figures 4 and 15, the movement both up and down and rearwardly has a velocity four times or more greater than during the forward motion of the wings.

Change angle of attack

Since, in order to obtain the maximum of efficiency, it is necessary to change the angle of attack during the forward and backward and upward and downward motion of the wings, I have provided on the sleeve part, 11, of each wing, a collar, 60, which has an arm, 61, and each arm is pivotally connected with a vertical rod, 62, which, in turn, is pivotally connected as at 63, with a coupling, 64, slidably mounted on the upper bar, 65, of a parallelogram constituted by end bars, 66, and a lower bar, 67, all of which are shown in Figure 11. The bars, 65 and 66, are oscillated by means of a master bar, 68, which is coupled to a drive shaft, 69, adjustably mounted in an adjustable bearing, 70, having an operating wheel, 71. The remaining end of the rod has a slotted fitting, 72, in which works the end of a drive shaft, 73, mounted in a fixed bearing, 74, and the remaining end of which is connected as at 75 for operation in the grove, 76, of a second cam wheel, 77, on the shaft, 43, so that the movement of the shaft, 43, transmits through the cam, 77, a reciprocating motion to the shaft, 73, and in turn, to the shaft, 69, while at the same time the relative position of the shaft can be adjusted by means of the member, 71. Manifestly, any adjustment of the shaft up and down will affect the amplitude of oscillation of the parallelogram composed of the members, 65 and 66. Under ordinary circumstances, the lower bar, 67, of the parallelogram does not oscillate through movement of the shaft, 69, since it is not only pivotally mounted as at 78 in the bearing, 79, but is connected by a rod, 80, with the end of the slotted guide member, 20. Accordingly, as the bars 65 and 66 are oscillated, the rod, 62, is drawn down or forced up, thereby moving the arm, 61, and changing the angle of attack of the wing. The mechanism heretofore described is repeated, element for element, with respect to each wing of the airplane, and adjustment of the angle of attack of each wing is rendered independent by the independent adjusting element, 71.

In order to change the angle of attack as either of the wings is moved up and down, the rod, 80, serves to oscillate the lower bar, 67, independent of the period of oscillation of the bars, 65 and 66, such motion being shown in Figure 13. The shafts, 69, are connected to the master bars, 68, pivotally, as shown in Figure 14, and the sleeve element, 81, is slidably mounted on the master bar, 68, for an obvious reason. Since the sliding member, 64, on the bar, 65, must be moved to different positions upon said bar, 65, and may pass the point of connection, 82, of the master bar, 68, with the bar, 65, I slot the bar, 68, in the manner shown at 83 in Figure 12, and place the end of the bar, 68, within the slot; the pivot point, 82, extending therethrough to connect the same with the bar, 65. The member, 64, is slotted as at 84, so that it may pass the bar, 68, after the manner which is clearly shown in Figure 12.

Wing butt construction

In describing the structure which induces the backward and forward motion of the wing, it was pointed out that the two oscillating members, 57 and 58, were connected with the wings. The oscillating member, 58, is connected directly with the wing butt, 13, of one wing through the instrumentality of a slotted arm, 85, said slot allowing for lateral motion of the member, 58, therewithin, as shown in Figure 17. Accordingly, as the member, 58, is moved back and forth, the wing butt is given a forward and backward motion. However, since the angle of attack of the wing is subject to change, and this change is induced through the sleeve part, 11, of the wing, sleeve, 11, is slotted as at 86, to allow the same to slightly rotate on the wing butt, 13; all of this structure being shown in Figure 16. The sleeve portion, 11, of each wing is mounted to slide in each of the guide members, 20, by means of a keeper, 87. The actual construction of the wing is, of course, subject to considerable modification. The other wing, 7, has an extension, 88, on one of the members, 15, of the wing butt, as clearly shown in Figure 18. This member, 88, is slotted as at 89, and the end of oscillating rod, 57, extends therethrough so that forward and backward motion is transmitted to said wing through the member, 88, and through the butt.

Referring specially to Figures 1, 2, and 3, it will be noted that the structure of each wing is cut away angularly from the body, as shown at 90 to accommodate the movement of the wings backward and forward. Each wing is formed with an outer pivoted section, 91, the points of pivot of said outer sections to the main wing structures being indicated at 92, and being adjacent to the forward or entering edge of the wing. To either side of the point of pivot, 92, of each outer wing section is one of a pair of springs 93a and 93b, which normally hold the outer sections in alignment with the main wing sections. However, as the wings move backward and forward, and especially backward, the inertia of the outer wing sections causes them to assume a position out of alignment with the main wing structure, that is tilted considerably back when either wing has reached the most backward position, and slightly forward when either wing has reached the forward position, thereby increasing the lift of the airplane. In order to cushion the action of the wings in their up and down movement, I provide in the main wing structure an inclined slot, 94, the forward portion of which is adjacent to and beneath the entering edge of the wing and the rear portion of which is adjacent to and above the trailing edge of the wing. Thus, air enters in a stream at the forward part of the slot and passes out at the back, relieving, to a considerable degree, the tendency to form a vacuum above the trailing edge of each wing, and to cushion the reciprocating action or up and down motion of the wings.

Operation

It is believed that the operation of my airplane will be apparent from the foregoing description of its several parts. However, in order that the cooperation of the various parts may be more readily understood, it is pointed out that all power necessary is taken from the shaft, 43, which, in turn, is operated through the power shaft, 48, transmission, 47, and lever and slotted member, 44, and 46, respectively. Assuming that the shaft, 43, is being actuated, the reciprocating, flapping or up and down movement of the wings, together with the back and forth motion of the wings, is induced as follows: The wings are moved back and forth in the ratio, respectively, four to one, or greater, or less by means of connections between the cranks, 49', through levers, 51, reciprocating shafts, 52, and oscillating rods, 57 and 58, which are connected with the wing butts; at the same time reciprocating shafts, 39, are actuated through the instrumentality of cams, 42, to oscillate rods, 30 and 31, which, through vertical shaft, 27, actuates the arms, 24, of the slotted guide members, 20, of the wings. Thus, as the wings are moved back and forth, they are also reciprocated up and down. That is, the flapping motion occurs simultaneously with the forward and backward motion, and the velocity of both is much greater during the backward interval than during the forward interval of movement.

Also, simultaneously with the foregoing types of motion, the angle of attack of the wings is modified and changed through the instrumentality of shafts, 69, which in turn are intergeared with cams, 77, it being noted that both cams, 42, and 77, are upon the main power shaft, 43, as also is the crank, 49. As the shafts, 69, reciprocate the master rod, 68, of the parallelogram composed of members 65, 66, and 67, is oscillated, thereby introducing in the vertical shaft, 62, an up and down motion which is transmitted to the arm, 61, attached to the sleeve of each wing, causing the angle of attack to vary as the wings assume various positions on their forward and backward path of travel. The particular angle of attack is determined by varying the positions of drive shafts, 69, through the instrumentality of adjusting mechanism, including the wheel, 71. The extent of the up and down, reciprocating, or flapping movement of the wings is in turn governed by the particular position of the vertical shaft, 27, as determined by the adjusting mechanism, including the adjusting wheel, 34. The extent of the forward and backward movement of the wings, on the other hand, is controlled by means of changing the position of the reciprocating rods, 52, through the instrumentality of the adjustable hangar, 54, and the operating wheel, 56. It will, therefore, be seen that all of the major motions and operations of the wings of my airplane are subject to control by the operator, and where hand wheel control has here been shown, lever control by the seat of the operator can very well be substituted.

The lateral stability of my airplane may be governed in any one of several ways. Thus, the amplitude of motion of any one wing may be regulated or lateral stability may be maintained by changing the angle of attack of any one wing. Longitudinal stability is controlled in the usual manner by the elevator which is the usual control element of all heavier than air machines, and the direction of flight by the usual rudder. The proper angle of attack is, of course, determined as a matter of practice and a constant lift is maintained through the simultaneous provision of a reciprocating or up and down movement, a changing angle of attack and the forward and backward motion of the wings. In practice a suitable power plant is located in the nose of the fuselage forward of the compartment, 8, such power plant (not shown) being connected in any suitable way with the main power shaft, 48. In practice there may be considerable modification in the structure and arrangement of the parts heretofore described for the reason that the requirements of different types of airplanes, different loads, different requirements of space and capacity, different conditions of operation may require changes in structure. However, the principle upon which my airplane operates is carried out throughout any changes in structure. Especially is it true that changes are liable to occur in the link, shaft and lever mechanism for inducing and controlling the various movements of the wings, and it is to be noted that throughout the sequences of motion the lift is kept very near to its maximum during the diminished velocity of the wing in its path of travel forward and backward, thereby compensating in a great degree to any tendency toward periodical moments when lift may be neutralized.

In practice the angle of attack of any wing presupposes an angular inclination of the wing with the trailing edge thereof below the entering edge when the wing is going forward and the trailing edge above the entering edge when the wing is going in a rearward direction, so that in either direction of movement of the wing lift is created.

While the preferred embodiment of my invention has been shown and described in the foregoing, it is again pointed out that my airplane is designed to produce the maximum efficiency according to the principle of bird flight. But in connection therewith it is emphasized that the interpretation of the invention should only be conclusive when made in the light of the subjoined claims:

I claim:—

1. An airplane of the type described comprising wings, means whereby said wings are moved with a backward and forward motion from a central common pivot point, means whereby said wings are moved up and down with a flapping motion simultaneously with said backward and forward motion and means whereby the angle of attack of said wings is controlled to coordinate the angle of attack to give a substantial constant lift during the first two motions of the wings.

2. A mechanism capable of aerial locomotion including wings, means for inducing simultaneously a backward and forward motion of the wings and an upward and downward or flapping motion of the wings, and at the same time changing the angle of attack, and means whereby all of said aforementioned motions are accelerated during the backward motion of said wings.

3. In an airplane of the type described comprising wings, said wings being pivoted at a common point within the fuselage, means for inducing a forward and backward motion of said wings, means for changing the angle of attack of said wings and means for inducing an upward and downward or flapping motion of said wings, all of said operations being simultaneous, and means for accelerating all of said motions during the backward motion of said wings.

4. In an airplane of the type described, a pair of wings pivoted within the fuselage for motion either upward and downward, or forwardly and rearwardly, means for actuating said wings to induce a continuous forward and backward and upward and downward motion thereof, means for automatically changing the angle of attack of said wings during said afore-mentioned motions thereof, whereby to induce a constant lift and means whereby all of said motions of the wings, together with the angle of attack thereof is subject to the control of the operator.

5. In an airplane of the type described comprising a plurality of wings universally pivoted within the fuselage, means for simultaneously actuating said wings to have an upward and downward and a forward and rearward motion, said wings being formed with hinged outer sections designed to increase inherent stability of the aircraft and slots formed in the main wing sections for cushioning said wings in their path of travel in an upward and downward direction.

6. In an airplane of the type described comprising a fuselage, a vertical mast within the fuselage, a pair of wings universally mounted on said mast, means for simultaneously reciprocating said wings back and forth and upward and downward, means for changing the angle of attack of said wings, a power plant and all of the said afore-mentioned wings being connected with the power plant for constant motion, having a considerable acceleration on the rearward path of travel of said wings.

7. In an airplane comprising a fuselage and a power plant, a pair of wings pivoted at a common point within the fuselage to be free to move about said pivot point either in an upward or downward, or a forward and rearward direction, a common drive shaft connected with the power plant mechanism connected with said drive shaft for inducing a variable forward and backward motion of said wings which is accelerated as the wings are moved backward, means connected with said drive shaft for inducing an upward and downward or flapping motion of said wings which is accelerated as the wings are moved in a rearward direction, and means connected with said drive shaft for automatically changing the angle of attack of said wings to induce a relatively constant lift.

8. In an airplane comprising a fuselage, a pair of slotted guide members pivoted intermediate their respective ends to a fixed part of the fuselage on either side thereof, a pair of wings pivoted at a common point within the fuselage, and extending through the guide members, means for reciprocating said wings in a forward and backward direction, and means for oscillating said guide members to give said wings an upward and downward motion during their movement forwardly and backwardly.

9. In an airplane comprising a fuselage having a pair of oscillating guide members pivoted in the respective sides of the fuselage, a pair of wings pivoted at a common point within the fuselage and extending through the guide members, means for reciprocating said wings back and forth, means for oscillating said guide members to cause said wings to assume a flapping or upward and downward movement during and simultaneous with the forward and backward motion of said wings and means for accelerating the motion of the wings both upwardly and downwardly, and backwardly to the point of greatest acceleration when the rearward travel of the wings is reached.

10. In an airplane comprising a power plant and a fuselage, a common drive shaft connected with the power plant, a pair of wings pivoted at a common point within the fuselage, means connecting the drive shaft with said wings to reciprocate the same back and forth, means in conjunction with said afore-mentioned means for accelerating the backward motion of said wings, means for simultaneously moving said wings up and down with a flapping motion during the movement forward and backward thereof, means for accelerating the upward and downward motion of said wings as the wings move on their rearward path of travel, said latter means being connected with the common drive shaft, and means connected with the common drive shaft for automatically changing the angle of attack of said wings at various points in their travel.

11. In a flaxing wing type of airplane having means for giving the wings a forward and backward and an upward and downward motion, means for cushioning the action of the wings, including a slot formed in each wing and inclined upwardly through the wing structure to have the forward end of the slot beneath and adjacent to the entering edge and the rearward end of the slot adjacent to the trailing edge of the wing.

12. In an airplane of the heavier than air type comprising sectional wings the outer section being pivoted to the entire section and means to either side of the pivot point for normally holding said wing sections in alignment, said outer pivoted sections being movable in a rearward direction through the action of inertia.

In testimony whereof, I affix my signature hereunto.

ALEX JORDANOGLOU.